United States Patent [19]

Liebel

[11] Patent Number: 5,366,790
[45] Date of Patent: Nov. 22, 1994

[54] COMPOSITE ARTICLE MADE FROM USED OR SURPLUS CORRUGATED BOXES OR SHEETS

[76] Inventor: Henry L. Liebel, 10 Tower Dr., Newport, Ky. 41071

[21] Appl. No.: 994,205

[22] Filed: Dec. 21, 1992

Related U.S. Application Data

[63] Continuation-in-part of Ser. No. 715,442, Jun. 14, 1991, abandoned.

[51] Int. Cl.⁵ ..................... B32B 3/28; B65D 19/00
[52] U.S. Cl. ..................... 428/184; 428/120; 428/182; 428/186; 428/212; 108/51.3; 52/553; 52/795; 52/799
[58] Field of Search ............... 428/174, 119, 182, 120, 428/184, 212, 186, 2, 55, 58, 77; 108/51.3; 52/400, 433, 462, 478, 518, 553, 795, 799, 806, 808

[56] References Cited

U.S. PATENT DOCUMENTS

| | | | |
|---|---|---|---|
| 1,955,833 | 4/1934 | Romanoff | 20/91 |
| 2,543,101 | 2/1951 | Francis | 154/101 |
| 3,519,525 | 7/1970 | Fourness | 161/120 |
| 3,590,751 | 7/1971 | Freid | 108/51 |
| 3,661,099 | 5/1972 | Sheler | 108/51 |
| 3,810,798 | 5/1974 | McCoy | 156/62.2 |
| 3,837,989 | 9/1974 | McCoy | 161/68 |
| 4,111,730 | 9/1978 | Balatinecz | 156/62.2 |
| 4,146,660 | 3/1979 | Hall et al. | 428/2 |
| 4,241,133 | 12/1980 | Lund et al. | 428/326 |
| 4,401,706 | 8/1983 | Sovilla | 428/158 |
| 4,810,445 | 3/1989 | Lamb, Sr. et al. | 264/112 |
| 5,059,466 | 10/1991 | Blumer | 428/106 |
| 5,137,668 | 8/1992 | Lamb, Sr. | 264/112 |

FOREIGN PATENT DOCUMENTS

| | | |
|---|---|---|
| 262898 | 6/1988 | European Pat. Off. . |
| 355056 | 6/1922 | Germany . |
| 152083 | 9/1983 | Japan . |
| 233354 | 9/1990 | Japan . |
| 495615 | 11/1938 | United Kingdom . |
| 675790 | 7/1952 | United Kingdom . |

Primary Examiner—Donald J. Loney
Attorney, Agent, or Firm—Wood, Herron & Evans

[57] ABSTRACT

A composite article useful as a material of construction made of a plurality of substantially aligned, individual pieces of corrugated cardboard cut from scrap corrugated boxes or sheets. The corrugated pieces lie in a shingle-like configuration, a bridge-like configuration, or a combination thereof and form multiple, generally planar layers of individual corrugated cardboard pieces having a length only a fraction of the full length of the article. The material of construction is particularly useful in making shipping pallets to replace wood pallets currently in use.

10 Claims, 4 Drawing Sheets

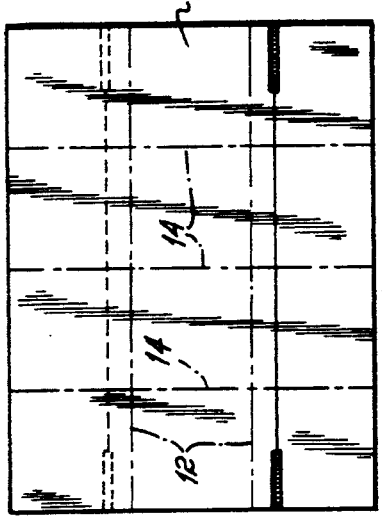
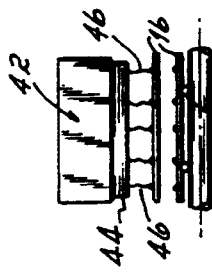
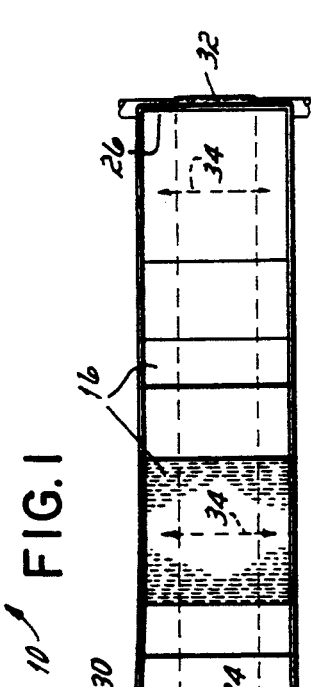
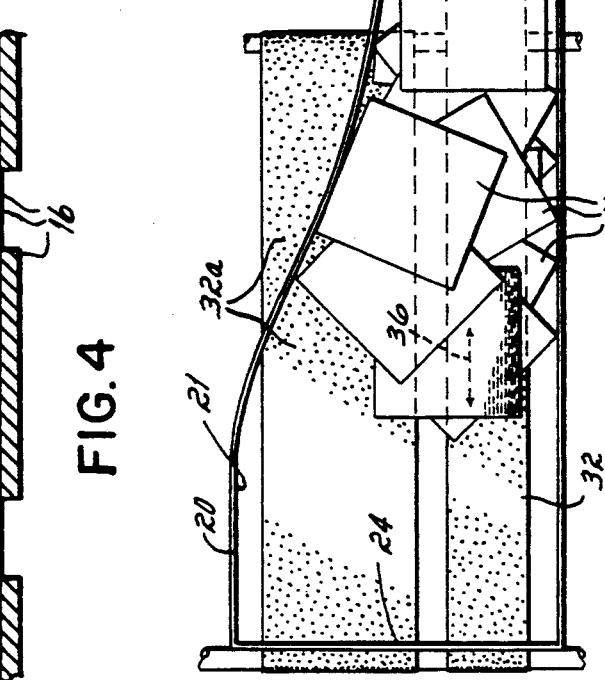
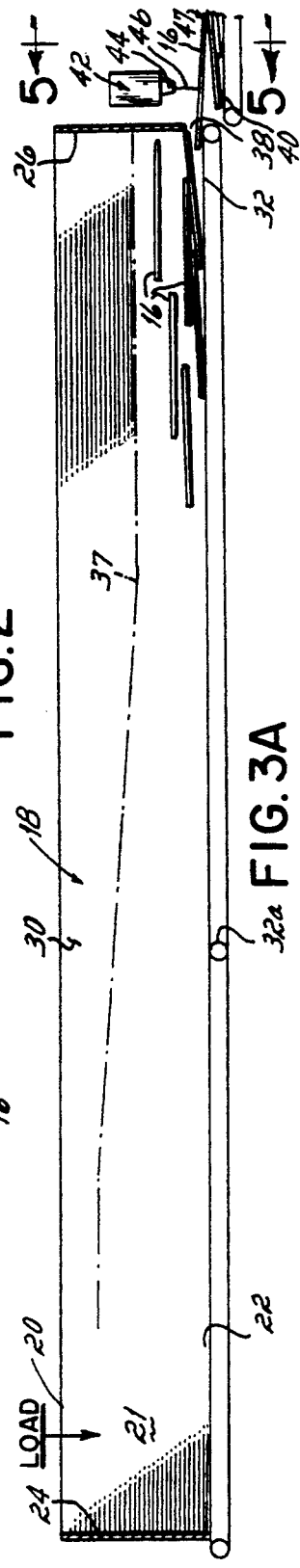

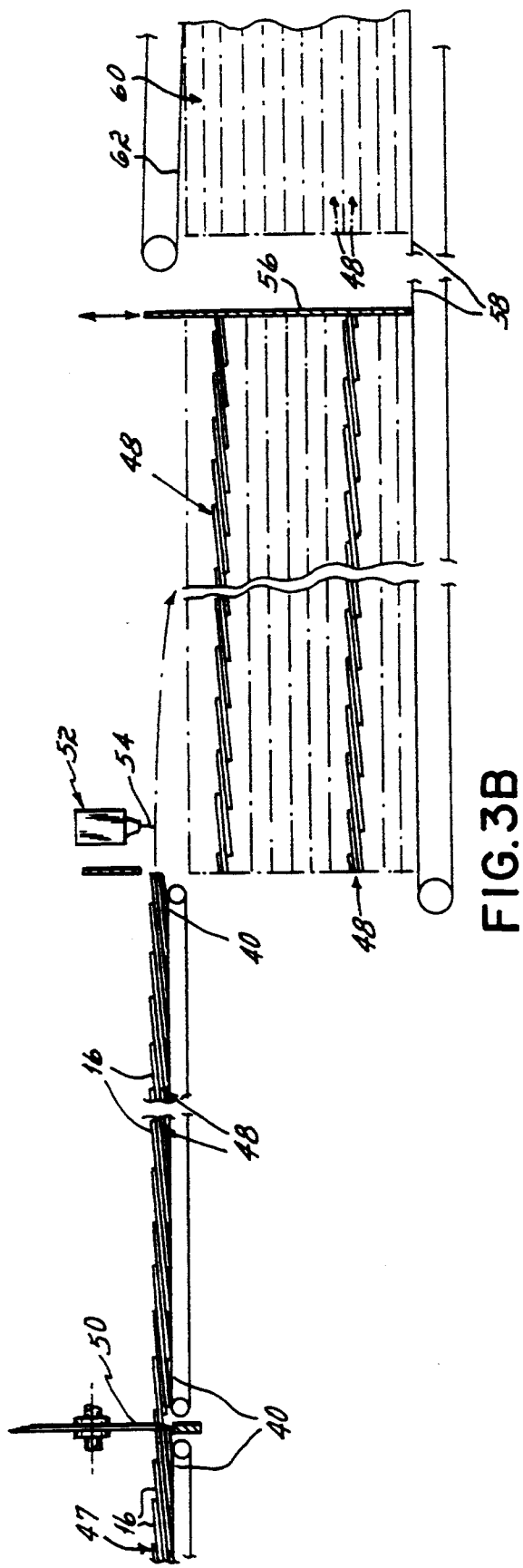
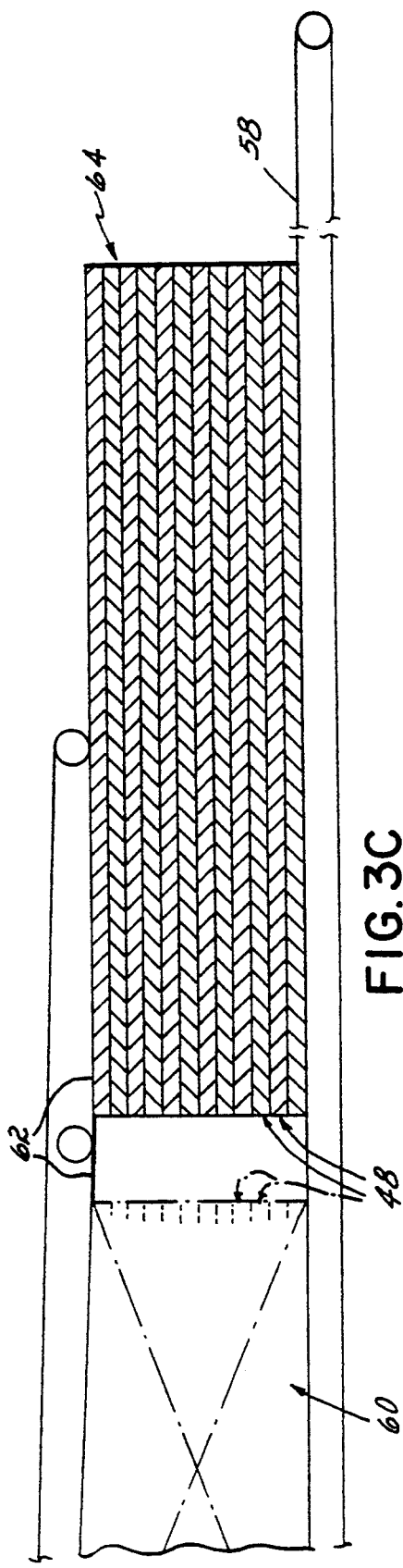
FIG.3B
FIG.3C

COMPOSITE ARTICLE MADE FROM USED OR SURPLUS CORRUGATED BOXES OR SHEETS

CROSS-REFERENCE TO RELATED APPLICATIONS

This application is a continuation-in-part of application Ser. No. 07/715,442, filed Jun. 14, 1991, now abandoned.

BACKGROUND OF THE INVENTION

In today's environment, it is generally recognized to be desirable to recycle as many materials as possible. These include, for example, glass and plastic containers, metal containers such as aluminum and steel, and paper goods, for example, used newspaper and corrugated boxes and sheets. In recycling of corrugated boxes and sheets, it is well known to crush them, bale them, and send them to a hydropulper operation to pulp the corrugated so that it may then be put through the papermaking and corrugating process again. However, recycling by hydropulping is both energy intensive and relatively expensive. If the market for used or surplus corrugated material is not economically justified, there is little incentive for recycling the corrugated.

At the same time, it is known to construct various articles useful in the transportation and shipping industry out of wood. For example, it is well known to construct out of wood shipping pallets upon which goods are loaded for transportation. These shipping pallets include a number of wood slats which span and are secured by nails or staples to wood supports providing an offset of the slats from the floor whereby the tines of a forklift truck can be placed under the pallet for lifting of the pallet with the load thereon. Wood pallets are used widely throughout industry today. However, wood pallets present a significant disposal problem. They cannot be burned for environmental reasons and thus must be disposed of in landfills. However, wood pallets do not easily decompose in landfills and take a significant volumetric portion of the available landfill space. Therefore, they may be chopped up and destructed for disposal in landfills but still do not degrade. Thus, wood pallets widely in use today present a significant disposal problem.

SUMMARY OF THE INVENTION

It is among the principal objects of this invention to provide an improved composite article useful as a material of construction formed from used or surplus corrugated boxes or sheets which eliminates the need for repulping of the used corrugated. This material of construction can be used to make a number of different articles. One article to which it is particularly suited is in the manufacture of shipping pallets formed entirely from scrap corrugated boxes or sheets thereby offering an attractive use of used corrugated boxes and sheets and an attractive alternative to hydropulping to recycle these used materials. Moreover, the shipping pallets of the present invention can themselves be destructed by hydropulping and the paper material reused thus eliminating the disposal problem with wood pallets entirely. As a result, the material of construction of the present invention presents essentially no environmental burden at all.

The composite article of the present invention is composed of a number of substantially aligned, individual pieces of corrugated cardboard which are cut from scrap corrugated boxes or sheets. The pieces are situated with respect to one another such that they lie in a shingle-like configuration, a bridge-like configuration, or a combination of the two, forming multiple, generally planar layers comprised of the individual cardboard pieces. The pieces in each planar layer, being cut from used boxes as sheets, have a length which is only a fraction of the full length of the article and the individual pieces are preferably adhered to adjacent pieces.

The present invention is predicated on the discovery that an improved article of construction may be formed by taking used scrap or surplus corrugated boxes or sheets, slitting them into strips and then slitting the strips at right angles to form multiple individual, essentially square pieces of used corrugated cardboard. These pieces are then stacked one upon another and can be aligned, if desired, so that the flute direction of the individual pieces are generally in the same direction. The individual pieces are disposed and adhered to each other such that they lie in a shingle-like configuration, a bridge-like configuration, or a combination thereof. The layered pieces of corrugated are cut to a predetermined length and stacked to a desired height with adjacent layers again being adhered thus forming an article having multiple, generally planar layers comprised of the individual corrugated cardboard pieces of a defined length with the individual corrugated cardboard pieces having a length only a fraction of the full length of the article.

The composite article thus has a predetermined height, length, and depth defined by the size of the individual rectangular pieces cut from the scrap corrugated boxes or sheets, the cutoff length of the planar layers, and the stacking height of the multiple layers. This article may then be sawed, e.g., with band saws, to form slabs or blocks or other configurations useful in constructing various articles.

In a present particularly preferred form of the invention, one of the articles constructed therefrom is a shipping pallet. In this connection, the composite article is sawed, for example, by means of a band saw to produce slabs of a desired thickness. The horizontal support structure of the pallet is formed by edge abutting and gluing several slabs together, preferably with the corrugated flutes being oriented perpendicular to the upper and lower faces thereof, and securing paperboard facing sheets to the upper and lower faces of the edge abutted slabs. The support legs for the shipping pallet are likewise cut from the composite article and adhered to the facing sheet on the underside of the horizontal support surface again with the flutes running in the direction perpendicular thereto. The resulting pallet has a relatively high degree of compressive strength but yet is relatively lightweight and inexpensive to produce. Further, it is not subject to cracking and splintering as are wood pallets. It contains no nails or staples which otherwise present disposability problems for wood pallets. Rather, to dispose of the shipping pallet of the present invention, it is merely necessary to hydropulp it with the resulting pulp being available for remanufacture of corrugated board.

BRIEF DESCRIPTION OF THE DRAWINGS

FIG. 1 is a plan view of a scrap corrugated box in flattened condition showing cut lines for producing the individual corrugated cardboard pieces.

FIG. 2 is a top view of one end of apparatus used in the manufacture of the composite article of the present invention.

FIG. 3A-3C is a side elevation schematic illustration showing the method of manufacture of the composite article of the present invention.

FIG. 4 is a cross-sectional schematic view of an alternative arrangement of corrugated pieces FIG. 5 is a view taken along line 5-5 of FIG. 3A.

DETAILED DESCRIPTION OF THE INVENTION

Figure 6:
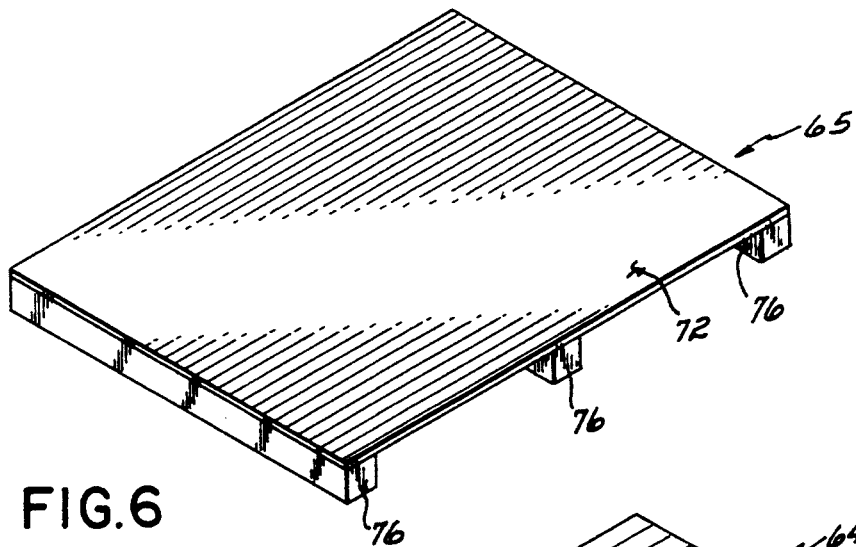
FIG. 6 is an isometric pictorial illustration of a completed shipping pallet.

Referring first to FIG. 1, in the method of manufacture of the composite article of the present invention, used scrap or surplus corrugated boxes or sheets are first gathered, flattened and put through a slitter to cut the boxes into strips of a desired width, which in a presently preferred form of the invention is on the order of 8 inches square. The used or scrap corrugated box 10 is first cut into strips along spaced cut lines 12 in a first direction. These strips are then put through a second slitter where they are cut at right angles along spaced cut lines 14 to form roughly square, corrugated pieces 16 on the order, e.g., of 8-inch×8-inch squares. That is, corrugated boxes of a standard dimension of 24×36 inches, for example, can be conveniently cut on 8-inch centers to produce 12 individual corrugated cardboard pieces generally of a 8×8 dimension. It will be recognized that these are only rough dimensions since because of non-uniformity of scrap boxes the pieces produced may likewise be somewhat non-uniform. In addition, smaller pieces resulting, for example, from cutting of the end flaps of the box may be produced. These smaller pieces may be either sorted out and discarded or may be incorporated into the composite article of the present invention without adverse effects. It has been found, however, that generally it is desired that 60% or more of the corrugated pieces 16 be of the preferred large dimension and of generally the same size and shape.

Referring to FIGS. 2 and 3A, the individual corrugated pieces 16 are loaded, either automatically or by hand, into a load reservoir 18 which includes an open top 20, open bottom 22, and vertically upstanding ends 24, 26 and side guides 28, 30 extending between the ends 24.26. A continuously moving conveyor 32 passes under the side guides 28, 30 and ends 24, 26 and provides a bottom supporting surface of the load reservoir 18.

The individual corrugated pieces 16 are loaded into the reservoir 18 at a larger rearward end 20 in a flat condition. An extension 32a of conveyor 32 provides a wider supporting surface at the larger rearward end 21. The facing sheets of the pieces 16 contact the surface of the conveyors 32 and 32a, and they lie generally flat one against another. In loading, provision can be made for insuring that the flutes of the individual pieces 16 are aligned as illustrated by the arrows 34 in FIG. 2. However, that is not critical to the invention, and pieces 16 having their flutes at 90° to the others (as illustrated by arrows 36) can be use without detracting from the invention.

It is recognized that the pieces 16 will not be edge aligned when loaded into the bin end 20; and, accordingly, one side guide 30 is made wider at its rearward end and progressively decreases in width to form with the other guide 28 a channel having a width generally equalling the cut width of the individual cardboard pieces 16, which in the case of the embodiment being described is about 8 inches. The pieces 16 moving on the conveyor 32 engage the side guides 28, 30 and are thus caused to turn and edge align themselves one with another, if desired, with the flutes being for the most part aligned as shown by arrows 34 in FIG. 2. The conveyor 32 conveys the individual corrugated pieces 16 toward the forward end wall 26 of the load reservoir 18. As a consequence of the loading and conveying of the individual pieces 16 in the load reservoir 18, they are cause to stack up upon each other, as illustrated by profile line 37, being constrained in a sideways direction by the side guides 28, 30 and in a forward direction by the forward end wall 26. As seen in FIG. 3A, the forward end wall 26 is spaced above the conveyor 32 to provide a slot 38 through which one or two of the individual pieces 16 can pass at a time. In the embodiment being described, the height of the slot is on the order of about 1¾ inches. This arrangement causes one or at most two pieces 16 of corrugated to be dispensed at a time out of the forward end 26 of the load reservoir 18.

The corrugated pieces 16 are dispensed onto a second continuously moving conveyor 40. The speed of this second conveyor is controlled to give a desired stacking arrangement of the individual pieces. That is, when the second conveyor 40 is run at a speed which is about 75% of that of the first conveyor, the individual cardboard pieces 16 dispensed from the load reservoir 18 overlap each other by about ⅜ in a shingle-like configuration as shown in FIGS. 3A and 3B. The individual pieces 16 on conveyor 40 can also be caused to be disposed in a bridge-like configuration, as illustrated schematically in FIG. 4, wherein pieces 16 bridge spaced pieces 16 below them. To accomplish this, the conveyor 40 is run at about the same speed as the conveyor 32 to place edge aligned individual corrugated pieces 16 on the conveyor without overlap but spaced one from another. Similar second and third reservoir units 18 downstream of the end 26 will then deposit additional corrugated pieces 16 on top thereof. The random spacing of the pieces 16 on the three conveyors will cause a number of the pieces 16 to bridge one another forming an array of corrugated pieces three high in the bridge-like configuration shown in FIG. 4. Additionally, the conveyor 40 speed and the number of conveyors used can be chosen to cause the individual corrugated pieces to be dispensed in an array which is a combination of both shingle-like and bridge-like configurations. In the embodiment shown in the drawings and described throughout, only the shingle-like configuration is shown, it being understood that the description of the invention is equally applicable to the other configurations just mentioned.

A glue dispensing head 42 is located at the forward end and above the second conveyor 40. This glue dispensing head 42 includes a nozzle 44 having a plurality of orifices spaced across the width of the conveyor 40

(FIG. 5) which dispense a continuous stream 46 of adhesive onto the corrugated pieces 16 being dispensed from the load reservoir 18. Thus, individual pieces 16 are glued to adjacent pieces. The second conveyor 40 moves continuously and carries the array of layered corrugated pieces 16 down the length of the conveyor (FIG. 3B). Because of the shingle-like or bridge-like configuration or combination thereof, this array of individual cardboard pieces adhered together is on the order of about ¾ inch in height. The conveyor 40 carries the moving array 47 to a cutoff device 50, such as a rotary knife, which is operable to cutoff a predetermined length 48 of the moving array 47 on the fly. This length can be any length desired, for example, on the order of 3 to 6 feet.

The cut off pieces 48 pass under a second glue dispensing head 52 like that shown in FIGS. 3A and 5 wherein additional adhesive 54 is applied to the upper face of the array 48 of individual corrugated pieces 16.

The cut lengths 48 are thrown forward against a vertical stop plate 56 and onto a continuously moving conveyor 58 to build up a stack 60 of individual lengths 48 of corrugated 16 as shown in FIG. 3B. the stack 60 can be built up to any desired height, for example, on the order of 12 inches high. When the stack 60 reaches the desired height, the end stop 56 is raised which permits the conveyor 58 to move the stack 60 with the layers 48 adhered to one another forward. The stack 60 passes under an overhead, continuously moving belt 62 which applies a compressive force to the stack 60 compressing it and increasing the adherence of the multiple layers 48 to each other. The resulting composite article is a block 64 of defined length, width, and height having multiple, generally planar layers 48 of individual corrugated cardboard pieces 16 adhered together in a shingle-like configuration, a bridge-like configuration, or a combination of the two, with the length of the individual pieces in any vertical plane being only a fraction of the full length of the finished article 64.

The composite article 64, which as stated is in the form of a block of defined height, width, and length, may be used as is as a structural component or individual pieces may be sawed from the block and joined together to form desired articles of manufacture. For purposes of illustrating such an application, the manufacture of a shipping pallet 65 (FIG. 6) from the block 64 of scrap corrugated will now be described with reference to FIGS. 7-9.

Figure 7:
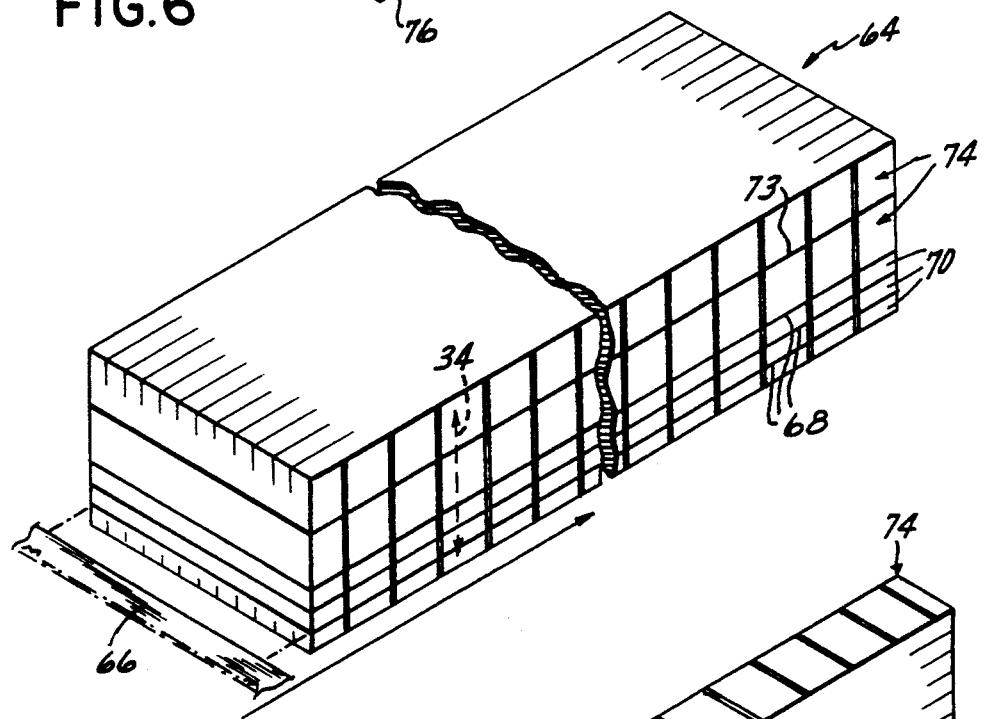
FIG. 7 is a isometric schematic illustration of the composite article exiting the conveyor illustrating the saw lines for manufacture of a pallet.
Figure 8:
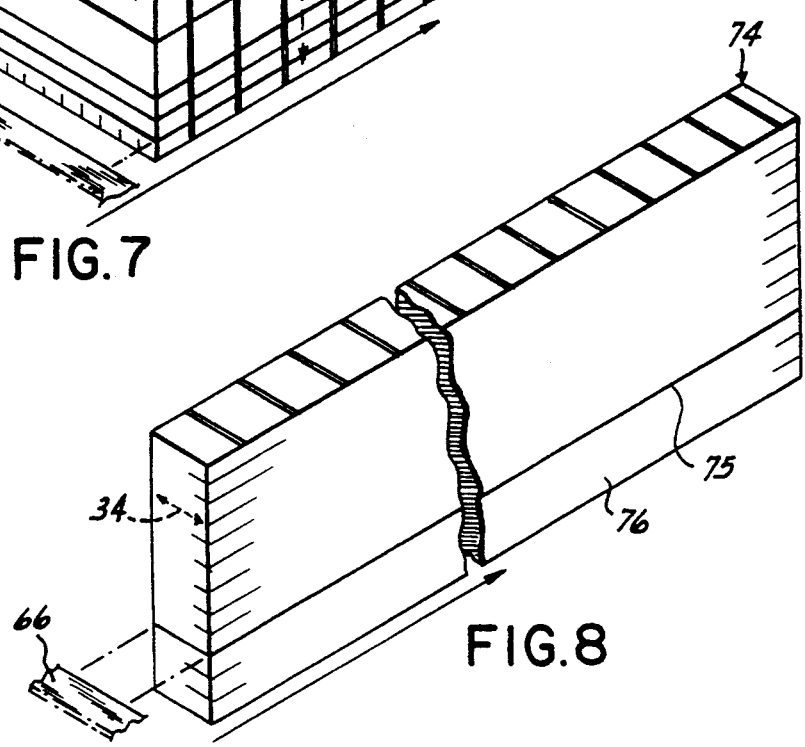
FIG. 8 is a schematic illustration of a slab cut from the article illustrated in FIG. 7.

Referring first to FIG. 7, the composite article 64 is rotated 90° and moved into a saw station including a horizontal band saw 66. By rotating the article 900, the original 8-inch width dimension is now the vertical dimension. If the flutes of the corrugated have been for the most part aligned as shown in FIG. 2, they will now run in a vertical direction. Individual saw cuts 68 are made to manufacture the various components. For example, in manufacturing of the pallet 65, three slabs 70, each being about 1-inch in height, are cut along lines 68 from the block 64 by means of the band saw 66 to form the top panel 72. Then two additional slabs 74, about 21 inches thick, are cut by cutting along line 73. The slabs 74 are again cut along line 75 in a perpendicular direction as shown in FIG. 8 by means of the band saw 66 to form supports beams 76, which are generally square in cross-section.

Figure 9:
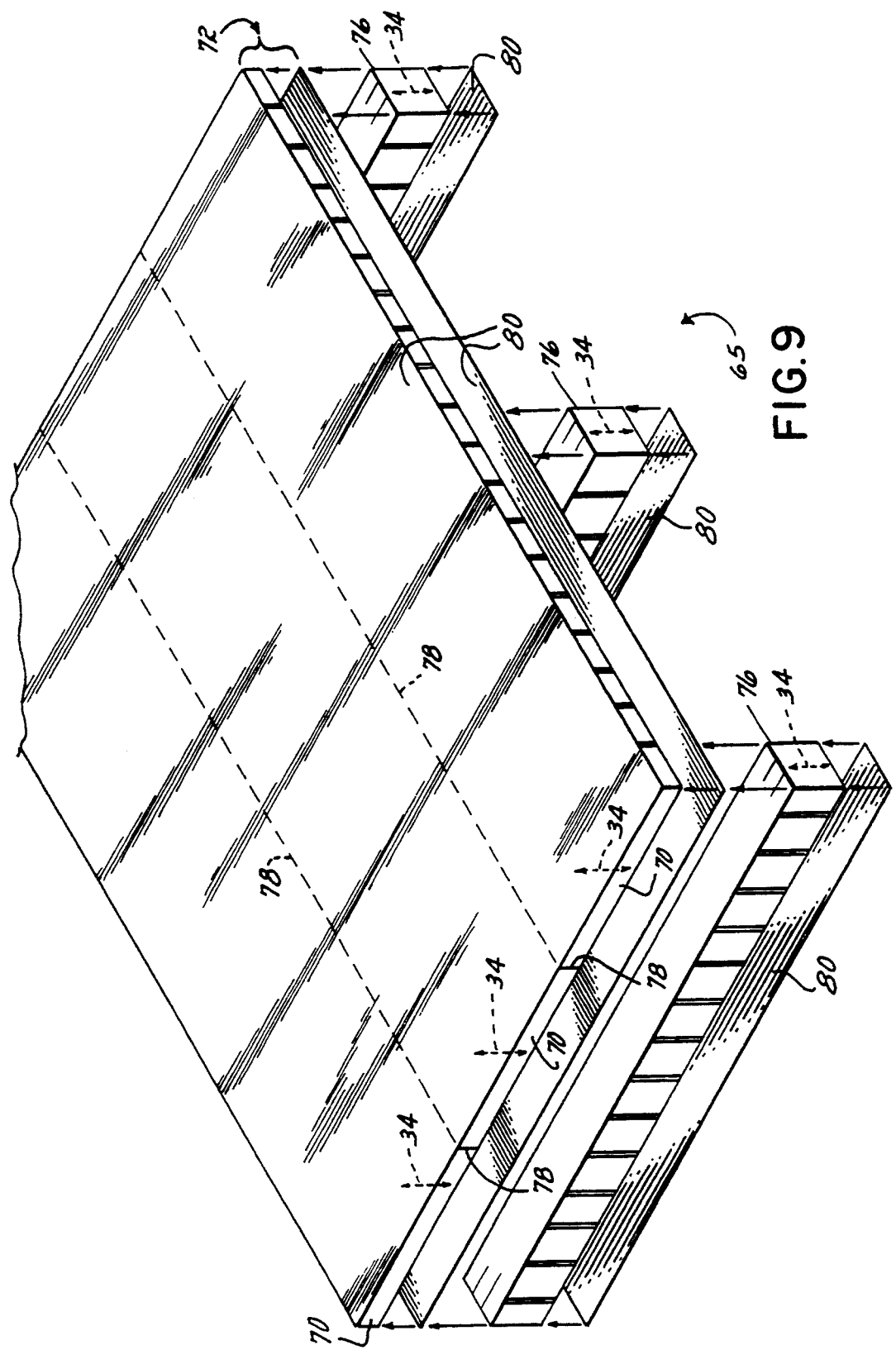
FIG. 9 is an isometric schematic illustration of the method of assembly of the pallet of the present invention.

Referring now to FIG. 9, the top panel slabs 70 are then abutted and glued together along their side faces (illustrated by lines 78) with the flutes running in a vertical direction perpendicular to the upper and lower faces. Linerboard sheets 80 which may be, for example, 69 pound or less kraft paper are adhered to the upper and lower planar faces of the top panels 72. This may be done by bringing linerboard 80 off of rolls onto the upper and lower faces and applying glue thereto to glue the assembly together. The support beams 76 are then placed at either end and the midpoint of the underside of the top panel 72 and adhered to the facing linerboard sheet. The support beams 76 can be oriented such that the flutes likewise run in a direction perpendicular to the faces of the top panel. This arrangement in combination with the flutes of the top panel provides the maximum compressive strength of the pallet. Facing sheets of linerboard 80 may likewise be applied to the underside of the support beams 76, if desired.

The resulting product is shown in FIG. 6 and comprises an upper horizontal top panel 72 supported by three support beams 76 adhered to the underside thereof at either end and along the midpoint. The beams 76 offset the top panel 72 from the floor whereby the tines of a forklift truck can be inserted thereunder to lift the pallet and load secured thereon. As stated, superior compressive strength is obtained by orienting the flutes in the vertical direction. An increase in strength is also obtained by the linerboard facing sheets 80 glued thereto and the support beams 76 glued to the underside of the top panel 72. The pallet 65 thus is made entirely of scrap corrugated and contains no nails or other materials which would present disposal problems and is not subject to cracking or splintering. Importantly, however, the pallet can be made substantially more inexpensively than wood pallets can. Finally, the pallet of the present invention is easily disposed of merely by shipping the pallets to a hydropulper where they may be pulped and the resulting material reused to manufacture paper or paperboard.

The composite article of the present invention has a number of applications for use as a material of construction. Its use in constructing a shipping pallet as described above is but one application. The material can be used, for example, for forming the core of a door in that the material provides strength against crushing of the door as well as insulative and sound deadening properties. The material may be used in other applications as well requiring either compressive strength in a given direction or insulative properties. Other uses contemplated include as a packing material to replace either corrugated stock or Styrofoam which itself presents disposal problems.

In all, the present invention provides not only for disposal of scraped corrugated boxes and sheets but also a resulting material of construction having superior properties and economies.

Thus having described the invention, what is claimed is:

1. A composite article useful as a material of construction comprising a plurality of substantially aligned, individual pieces of corrugated cardboard cut from scarp corrugated boxes or sheets, said pieces being disposed and adhered with respect to one another such that they lie in a shingle-shaped configuration, a configuration of unconnected pieces being adjoined by a piece deposited on top thereof and spanning said unconnected pieces, or a combination thereof, and forming multiple, generally planar layers comprised of said individual corrugated cardboard pieces having a length only a fraction of the full length of the article.

2. The composite article of claim 1 wherein at least about 60% of the individual pieces are of substantially uniform size and shape.

3. The composite article of claim 1 wherein the individual pieces are square in shape and have flutes extending generally perpendicular to the edges thereof.

4. The composite article of claim 3 wherein said flutes are generally aligned in a single direction.

5. The composite article of claim 1 wherein in each planar layer the individual pieces lie in a shingle-shaped configuration overlapping adjacent pieces by about two-thirds.

6. A shipping pallet comprising:
   a planar support panel having opposed planar faces and comprising a plurality of substantially aligned, individual pieces of corrugated cardboard cut from scrap corrugated boxes or sheets, said pieces being disposed and adhered with respect to one another such that they lie in a shingle-shaped configuration, a configuration of unconnected pieces being adjoined by a piece deposited on top thereof and spanning said unconnected pieces, or a combination thereof, and forming multiple, generally planar layers comprised of said individual corrugated cardboard pieces having a length only a fraction of the full length of the article,
   a plurality of supports attached to one side of said planar support panel.

7. The shipping pallet of claim 6 wherein said supports comprise a plurality of support beams attached to one side of said planar support panel, said support beams comprising a plurality of substantially aligned, individual pieces of corrugated cardboard cut from scrap corrugated boxes or sheets, said pieces being disposed and adhered with respect to one another such that they lie in a shingle-shaped configuration, a configuration of unconnected pieces being adjoined by a piece deposited on top thereof and spanning said unconnected pieces, or a combination thereof, and forming multiple, generally planar layers comprised of said individual corrugated cardboard pieces having a length only a fraction of the full length of said beams.

8. The shipping pallet of claim 6 further comprising facing sheets of paper adhered to and covering said opposed planar faces.

9. The shipping pallet of claim 8 wherein said supports comprise support beams which are adhered to one of said facing sheets coveting one of said opposed planar faces.

10. The shipping pallet of claim 6 wherein the flutes of said individual pieces of corrugated cardboard are substantially aligned in a direction perpendicular to said opposed planar faces.

* * * * *